(12) United States Patent  
Call et al.

(10) Patent No.: US 9,693,328 B1
(45) Date of Patent: Jun. 27, 2017

(54) DEVICE AND METHOD FOR SYNCHRONIZING DATA ASSOCIATED WITH A VEHICLE TEST

(71) Applicant: STATE FARM MUTUAL AUTOMOBILE INSURANCE COMPANY, Bloomington, IL (US)

(72) Inventors: Shawn M. Call, Bloomington, IL (US); Jackie O. Jordan, II, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/051,292

(22) Filed: Feb. 23, 2016

Related U.S. Application Data

(60) Provisional application No. 62/233,087, filed on Sep. 25, 2015.

(51) Int. Cl.
H04W 56/00 (2009.01)
H04B 7/26 (2006.01)
H04M 7/12 (2006.01)
H04W 88/02 (2009.01)

(52) U.S. Cl.
CPC .......... H04W 56/0015 (2013.01); H04B 7/26 (2013.01); H04M 7/1295 (2013.01); H04W 88/02 (2013.01)

(58) Field of Classification Search
None
See application file for complete search history.

(56) References Cited

U.S. PATENT DOCUMENTS

2016/0039291 A1* 2/2016 Reese ............... B60L 3/12
701/29.3

* cited by examiner

Primary Examiner — Diane Mizrahi
(74) Attorney, Agent, or Firm — Marshall, Gerstein & Borun LLP; Randall G. Rueth

(57) ABSTRACT

A synchronization device for synchronizing data associated with a vehicle test is presented. The synchronization device may include signal-generating circuitry configured to generate a signal and provide the signal to at least one output device associated with a vehicle so as to allow a data collection device to receive the signal from the at least one output device. The synchronization device may also include first additional circuitry configured to prevent the data collection device from receiving the signal based on whether a test associated with the vehicle has started. At least one of the providing of the signal to the at least one output device or the preventing of the data collection device from receiving the signal may indicate a start of the test and may allow data collected by the data collection device to be synchronized with other collected data.

20 Claims, 8 Drawing Sheets

DEVICE AND METHOD FOR SYNCHRONIZING DATA ASSOCIATED WITH A VEHICLE TEST

CROSS-REFERENCE TO RELATED APPLICATION

The present application claims the benefit of U.S. Provisional Patent Application No. 62/233,087, entitled "Device and Method for Synchronizing Data Associated with a Vehicle Test" and filed on Sep. 25, 2015, which is hereby expressly incorporated by reference herein in its entirety.

FIELD OF THE DISCLOSURE

The present disclosure generally relates to synchronizing data and, more particularly, to a device and method for synchronizing data associated with a vehicle test.

BACKGROUND

During a vehicle test, such as crash test, multiple devices are sometimes used to electronically record data associated with the test. For example, various types of instrumentation are placed inside a vehicle during the test, and this instrumentation collects various corresponding types of data. Where the instrumentation is distributed across multiple devices, the data collected by the multiple devices is compared and analyzed in order to perform an overall analysis of the collected data associated with the test.

Comparing and analyzing the data collected by the multiple devices has in some cases been performed with reference to indications of time obtained from a computing network, such as indications of time obtained by multiple mobile phones from a network time server. Indications of time obtained by multiple mobile phones, where the multiple mobile phones each include the instrumentation discussed above, are used in an attempt to synchronize the data collected by the multiple mobile phones with respect to a start of the test. The data collected by the multiple mobile phones is then compared and analyzed. However, an indication of time obtained by a mobile phone is susceptible to distortions caused by drift within the mobile phone; slight movements of the mobile phone; slight movements of seats or other objects within the vehicle before the crash test begins, which result in corresponding movements of the mobile phone; and various other factors. Consequently, synchronizing data collected by multiple mobile phones using indications of time obtained by the multiple mobile phones leaves the comparison and analysis of data susceptible to error, particularly given the need for precise synchronization of data associated with a vehicle crash test because of the extremely short duration of the actual crash event.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a synchronization device for synchronizing data associated with a vehicle test may be provided. The synchronization device may include signal-generating circuitry configured to generate a signal. The signal-generating circuitry may also be configured to provide the signal to at least one output device associated with a vehicle so as to allow a data collection device associated with the vehicle to receive the signal from the at least one output device. The synchronization device may also include first additional circuitry configured to prevent the data collection device associated with the vehicle from receiving the signal based on whether a test associated with the vehicle has started. At least one of the providing of the signal to the at least one output device or the preventing of the data collection device associated with the vehicle from receiving the signal may indicate a start of the test associated with the vehicle, and may allow data collected by the data collection device associated with the vehicle to be synchronized with data collected by at least one additional data collection device associated with the vehicle. The first additional circuitry may be configured to be caused to prevent the data collection device associated with the vehicle from receiving the signal by at least one of the at least one additional data collection device associated with the vehicle.

In another embodiment, a method for synchronizing data associated with a vehicle test may be provided. The method may include generating, using signal-generating circuitry of a synchronization device, a signal. The method may also include providing, using the signal-generating circuitry of the synchronization device, the signal to at least one output device associated with a vehicle so as to allow a data collection device associated with the vehicle to receive the signal from the at least one output device. The method may additionally include preventing, using first additional circuitry of the synchronization device, the data collection device associated with the vehicle from receiving the signal based on whether a test associated with the vehicle has started. At least one of providing the signal to the at least one output device or preventing the data collection device associated with the vehicle from receiving the signal may indicate a start of the test associated with the vehicle, and may allow data collected by the data collection device associated with the vehicle to be synchronized with data collected by at least one additional data collection device associated with the vehicle. At least one of the at least one additional data collection device associated with the vehicle may cause the first additional circuitry to prevent the data collection device associated with the vehicle from receiving the signal.

In yet another embodiment, a non-transitory computer-readable medium may be provided that includes instructions stored thereon, where the instructions, when executed by one or more processors of a first device, cause the one or more processors to receive a signal initially indicating one of that a test associated with a vehicle has not started or that the test associated with the vehicle has started. The instructions, when executed by the one or more processors, may also cause the one or more processors to detect, when the received signal initially indicates that the test associated with the vehicle has not started, that the received signal subsequently indicates that the test associated with the vehicle has started. The instructions, when executed by the one or more processors, may additionally cause the one or more processors to determine a first time at which the received signal indicates that the test associated with the vehicle has started. The instructions, when executed by the one or more processors, may further cause the one or more processors to provide a first indication of the determined first time at which the received signal indicates that the test associated with the vehicle has started so as to allow synchronization of the first indication of the determined first time with at least a second indication of at least a determined second time at which at least a second device determines that the test associated with the vehicle has started. The at least the second indication may be provided from the at least the second device. Each of the first device and the at least the second device may be associated with the vehicle.

BRIEF DESCRIPTION OF THE DRAWINGS

The figures described below depict various aspects of the devices and methods disclosed herein. It should be understood that each figure depicts an embodiment of a particular aspect of the disclosed devices and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
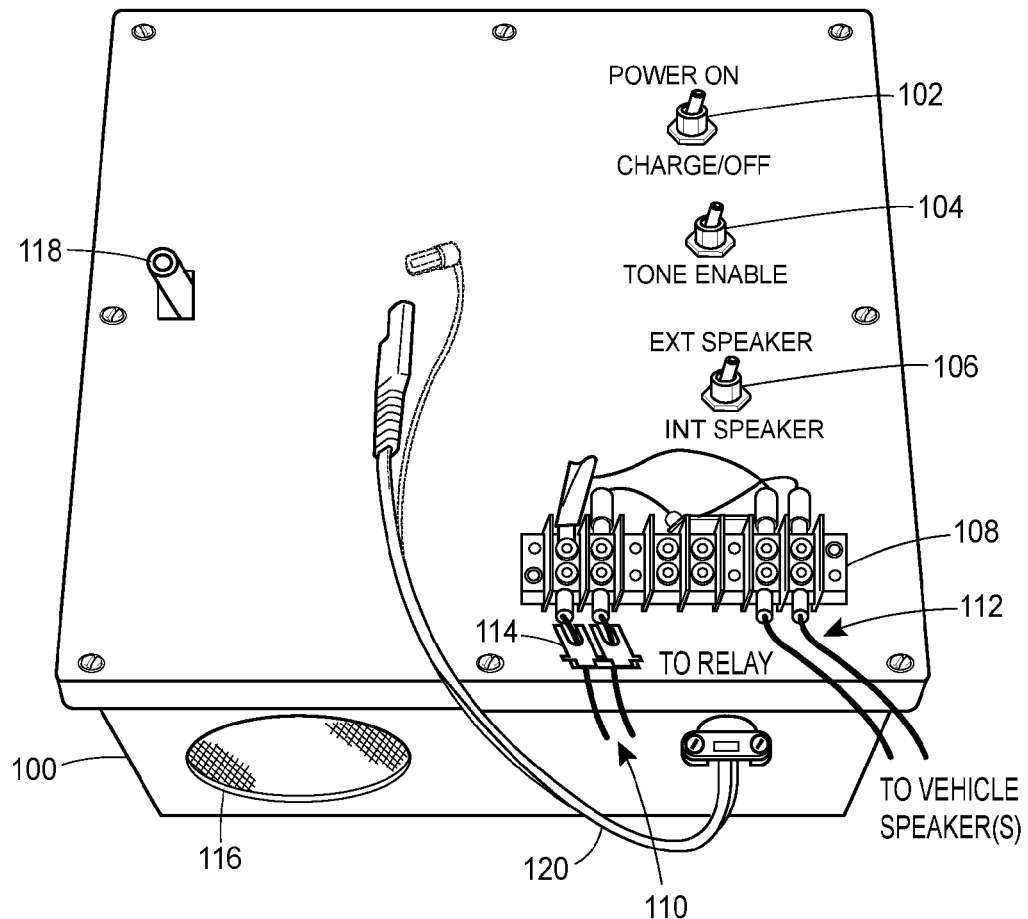
FIG. 1 illustrates an example synchronization device for synchronizing data associated with a vehicle test, such as a crash test.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

I. Example Synchronizing of Data Associated with a Vehicle Test

The present embodiments relate to, inter alia, a device and method for synchronizing data associated with a vehicle test. More particularly, a synchronization device may include signal-generating circuitry configured to generate a signal. For example, the generated signal may be an audio tone signal, such as a dual-tone multi-frequency (DTMF) signal, such that the signal produces an audible tone when output via, for example, a speaker. The signal may be caused to be audible by, for example, a lack of connection of test equipment to the signal-generating circuitry or other suitable portion of the synchronization device, which lack of connection may indicate that a test associated with a vehicle, such as a crash test, has not started, as further discussed below. The generated signal may, in some embodiments, be a suitable electromagnetic signal such as a radio frequency signal. The radio frequency signal may be a BLUETOOTH® signal.

The signal-generating circuitry may provide the signal to at least one output device associated with the vehicle, such as one or more speakers internal to the synchronization device or one or more speakers external to the synchronization device, such as one or more speakers of the vehicle, where the synchronization device may be located inside the vehicle. The signal may be provided to the at least one output device so as to allow a data collection device associated with the vehicle, such as a mobile phone located inside the vehicle or any other suitable computing device and/or sensing device, for example, to receive the signal from the at least one output device. For example, in the case of the at least one output device including at least one speaker external to the synchronization device such as at least one built-in vehicle speaker, where the data collection device is a mobile phone located in the driver and passenger area of the vehicle, the data collection device may receive the signal by a microphone of the mobile phone receiving the signal output from the at least one built-in vehicle speaker.

The synchronization device may also include first additional circuitry configured to prevent the data collection device associated with the vehicle from receiving the signal based on whether the test associated with the vehicle has started. The first additional circuitry may include switching circuitry, such as, for example, a relay, configured to interrupt the providing of the signal to the at least one output device so as to prevent the data collection device (e.g., mobile phone) associated with the vehicle from receiving the signal. For example, the switching circuitry (e.g., relay)

may be normally closed, and may be caused to opened by connection (e.g., electrical connection) of an additional data collection device such as the aforementioned test equipment to the switching circuitry at the start of the test. Opening of the switching circuitry may interrupt the providing of the signal (e.g., audio signal) as discussed above, and thus the signal may no longer be detected by, for example, the microphone of the mobile phone. As discussed below, multiple mobile phones and/or other suitable data collection devices may be placed in the vehicle during the test, and the opening of the switching circuitry may cause the signal to no longer be detected by any of the mobile phones, where the signal may previously have been detected by all of the mobile phones.

The preventing of the data collection device(s) (e.g., mobile phone(s)) from receiving the signal may be based on the start of the test associated with the vehicle, may thus indicate the start of the test, and may advantageously allow data collected by the data collection device(s) (e.g., mobile phones) to be synchronized with data collected by an additional data collection device (e.g., test equipment such as industrial-grade test equipment) associated with (e.g., inside of) the vehicle. The additional data collection device (e.g., test equipment) may cause the first additional circuitry to prevent the data collection device(s) such as mobile phones from receiving the signal by, for example, causing the first additional circuitry to open in the case where the first additional circuitry is or includes a relay. The causing of such a relay to open is further described below. The use of the prevention of the data collection device(s) from receiving the signal to indicate the start of the test and allow, for example, the mobile phones in a vehicle under test to be synchronized with test equipment in the vehicle under test may thus provide a single source of synchronization to the mobile phones and the test equipment in the form of the prevention of the receipt of the signal. That is, the test equipment may also be configured to receive the signal generated by the signal-generating circuitry, and may similarly be prevented from receiving the generated signal when the switching circuitry opens. Thus, the test equipment may also be synchronized with the mobile phones with respect to, for example, a start time of the test as indicated by the prevention of the test equipment and mobile phones from receiving the signal. In this manner, post-test analysis of collected data associated with the test need not include synchronization based on, for example, indications of time obtained from a network time server, and thus synchronization of the collected data across devices (e.g., between the mobile phones and the test equipment) avoids the shortcomings of synchronization that relies upon, for example, indications of time obtained from a network time server as discussed above. Other advantages will be recognized by one of ordinary skill in the art in light of the teaching and disclosure herein.

II. Example Synchronization Device, Placement, and Related Functionality

FIG. 1 illustrates an example synchronization device 100 for synchronizing data associated with a vehicle test, such as a crash test. The example synchronization device 100 may include a first switch 102, a second switch 104, a third switch 106, a terminal strip 108, a first pair of wires 110 leading from the terminal strip 108 to switching circuitry (the switching circuitry not shown in the example of FIG. 1), a second pair of wires 112 leading to vehicle speakers (the vehicle speakers not shown in the example of FIG. 1), a shorting jumper 114, an internal speaker(s) 116 (e.g., built into the example synchronization device 100), a volume control device 118, and a battery charge cord 120.

The first switch 102 may be movable between a first or "POWER ON" position in which a battery of the synchronization device 100 (not shown in FIG. 1) provides power to components of the synchronization device 100 such as the aforementioned signal-generating circuitry (not shown in FIG. 1), and a second or "CHARGE/OFF" position in which the battery charge cord 120 may be connected to a battery charger to charge the battery. The battery of the synchronization device 100 may be any suitable battery, such as a 12 volt sealed lead-acid battery. However, it will be appreciated from the teaching and disclosure herein that any suitable power source, such as any suitable DC power source, may be used to power the synchronization device 100. Additional detail regarding the first switch 102 is further discussed below.

The second switch 104 may be turned on or off in order to enable or disable the signal generated by the aforementioned signal-generating circuitry, and may thus be labeled "TONE ENABLE" as shown in the example of FIG. 1. Additional detail regarding the second switch 104 is also further discussed below. The third switch 106 may be used to select whether the internal speaker(s) 116 of the synchronization device 100 receives the signal generated by the signal-generating circuitry, or whether an external speaker(s) such as a speaker(s) in a driver and passenger area of the vehicle receives the signal generated by the signal-generating circuitry. As such, the example of FIG. 1 shows the third switch 106 as movable between an "EXT SPEAKER" position and an "INT SPEAKER" position. The discussion below further includes additional detail regarding the third switch 106.

The terminal strip 108 may provide electrical contacts for the first pair of wires 110 that lead to switching circuitry, as noted above and further discussed below. The terminal strip 108 may also provide electrical contacts for the second pair of wires 112 that lead to the vehicle speaker(s) (e.g., the speaker(s) in the driver and passenger area of the vehicle), as noted above and further discussed below. The shorting jumper 114 may be in place over the first pair of wires 110 initially, such as when the synchronization device 100 is provided for use during the test associated with the vehicle. The shorting jumper 114 may be removed when the synchronization device 100 is connected to a data collection device and, more particularly, when the synchronization device 100 is connected to test equipment (the test equipment not being shown in FIG. 1 and being further discussed below).

The volume control device 118 may be any suitable device for adjusting the volume of the signal generated by the signal-generating circuitry and output through, for example, the internal speaker(s) 116 or the external (e.g., driver and passenger area) speaker(s). For example, the volume control device 118 may be a suitable button or knob. In some examples, the volume control device 118 may include a slotted potentiometer which may be contained within the cover of the volume control device 118 visible in the example of FIG. 1. A device may be inserted through an open top of the cover of the volume control device 118 and into the slot of the potentiometer in order to adjust the volume as desired. In one example, a flat-blade screwdriver may be inserted through the open top of the cover of the volume control device 118 and maneuvered so that the blade is within the slot of the potentiometer. The potentiometer may then be rotated using the blade in order to adjust the volume as desired.

Figure 2:
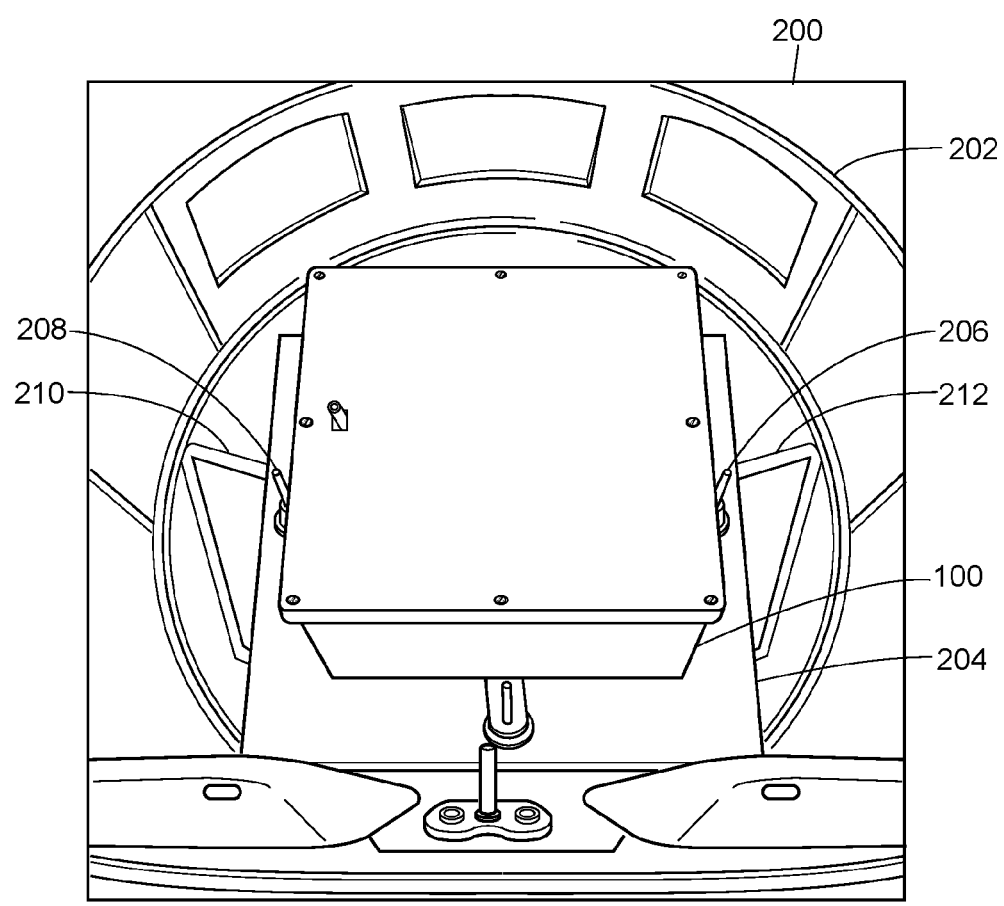
FIG. 2 illustrates an example placement of the example synchronization device of FIG. 1 within a section of a vehicle that is subject to the vehicle test.

FIG. 2 illustrates an example placement of the example synchronization device 100 of FIG. 1 within a section 200 of a vehicle that is subject to the vehicle test, e.g., crash test. More particularly, as shown in the example of FIG. 2, the example synchronization device 100—which is illustrated in a simplified form in FIG. 2 without various elements of the example synchronization device 100 shown in FIG. 1—may be placed in the spare tire compartment 202, which of course may be in a trunk of the vehicle. The example synchronization device 100 may be placed on top of a protective layer 204, such as a layer of cushioning, for protection during the crash test(s) for which the example synchronization device 100 is to be used in the vehicle. In one example, the protective layer 204 may be a layer of foam cushioning, though it will be understood that any suitable protective layer may be used in implementing the protective layer 204. The example synchronization device 100 may also be held in place by bolts 206 and 208 on sides of the example synchronization device 100. However, any suitable structures and/or materials may be used to hold the example synchronization device 100 in place, and such structures and/or materials may be present on more or less than two sides of the example synchronization device 100. Furthermore, the example synchronization device 100 and protective layer 204 may also be held in place using additional structures 210 and 212 on sides of the example synchronization device 100. As with the example bolts 206 and 208, such structures and/or materials may be present on more or less than two sides of the example synchronization device 100, and need not be present on the same sides, or number of sides, of the synchronization device 100 as are the bolts 206 and 208 (or other suitable structure(s) and/or material(s) used in place of the bolts 206 and 208).

Figure 3:
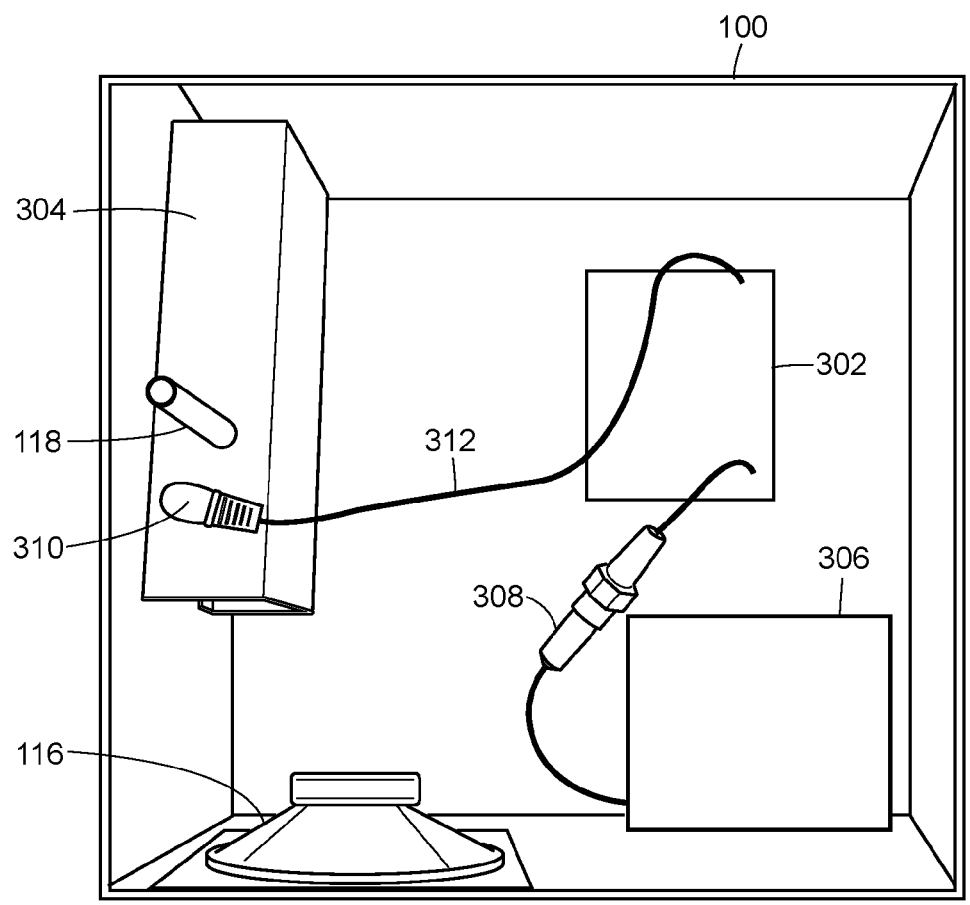
FIG. 3 illustrates a simplified overhead view of the example synchronization device of FIG. 1, showing a simplified example implementation of various components of the example synchronization device of FIG. 1.

FIG. 3 illustrates a simplified overhead view of the example synchronization device 100, showing a simplified example implementation of various components of the example synchronization device 100. As shown in the example of FIG. 3, the example synchronization device 100 may include a signal generator 302, an amplifier 304, the internal speaker(s) 116, and a battery 306, which may be the battery discussed above. A fuse holder 308 may be used to protect the circuitry of the example synchronization device 100 from current overload. In one example, the fuse holder 308 may be spring-loaded and may contain a standard, 5-ampere automotive glass cartridge-type (AGC-type) glass fuse. However, it will be appreciated in light of the teaching and disclosure herein that the fuse holder 308 may be any suitable type of fuse holder and may contain any suitable type of fuse.

The amplifier 304 may include an amplifier audio input 310 electrically connected to the signal generator 302 via a suitable electrical connection 312, as further discussed below with respect to, for example, FIG. 4. The amplifier 304 and the input thereto are further discussed below with respect to, for example, FIG. 4. As noted above in the discussion of, for example, FIG. 1, the synchronization device 100 may include a volume control device 118, and as shown in FIG. 3, the volume control device 118 may be coupled to the amplifier 304. It will be understood that, for clarity of illustration, not all of the electrical connections within the example implementation of the synchronization device 100 shown in FIG. 3 are illustrated in FIG. 3. Example electrical connections corresponding to the synchronization device 100 are further described with respect to, for example, FIG. 4.

As further described below, the example synchronization device 100 allows data that is associated with a vehicle test, such as a crash test, and that is collected by multiple data collection devices, to be synchronized more reliably than synchronization achieved, for example, by such data collection devices receiving indications of a time from a network time server. As such, the data collected by the data collection devices may be more accurately compared and used to determine, for example, how accurate and/or precise mobile phones are in collecting data associated with the vehicle test as compared to the accuracy and/or precision of data collected by the test equipment, which may include industrial-grade sensing devices, for example. Such determinations of the accuracy and/or precision of mobile phone data collection regarding, for example, a crash event may be useful in developing, for example, an application for mobile phones that may be distributed by an insurance provider. Such an application may be executed on a mobile phone of an insured party in order to perform crash detection when the insured party is normally driving a vehicle; that is, outside the context of a crash test or other test associated with the vehicle.

III. Example Wiring of Synchronization Device

Figure 4:
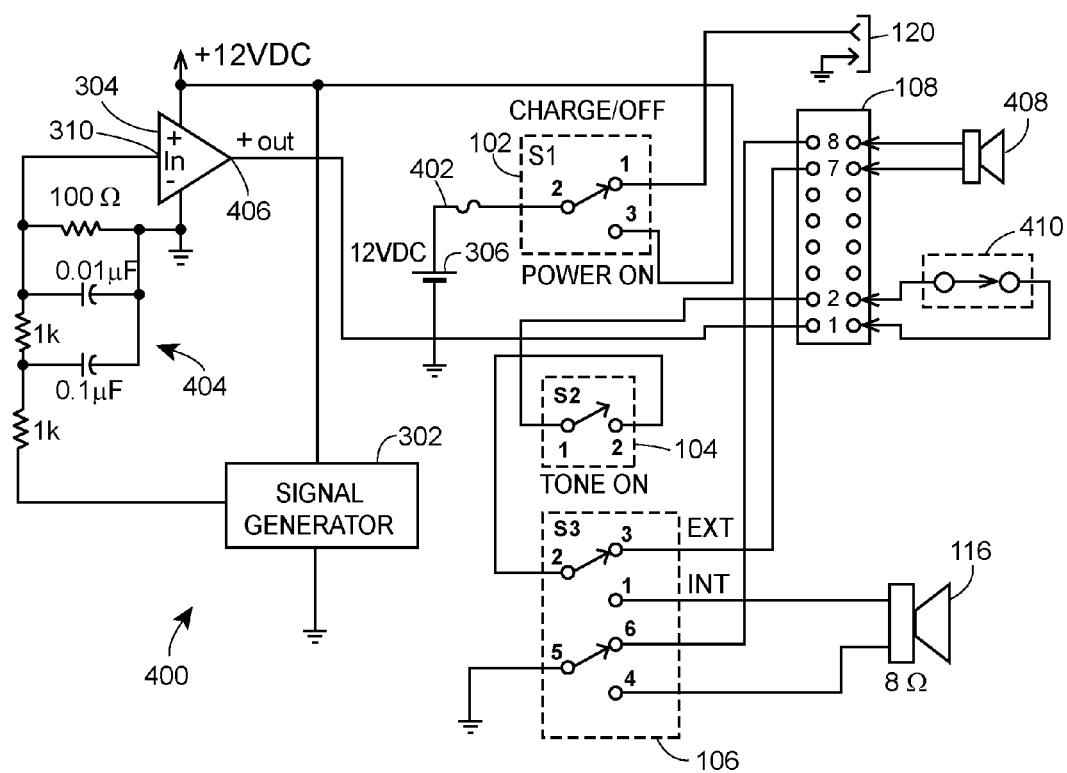
FIG. 4 is an example wiring diagram corresponding to a synchronization device, such as the example synchronization device of FIG. 1.

FIG. 4 is an example wiring diagram 400 corresponding to a synchronization device, such as the synchronization device 100 described above. As shown in FIG. 4, the signal generator 302, such as a DTMF generator or other tone generator as discussed above, receives power, such as +12 volts DC power, supplied by the battery 306 when the first switch 102 (also represented by "S1" in FIG. 4) is in the first or POWER ON position as discussed above. Further to the discussion of FIG. 1, the first switch 102 may be a single pole, double throw (SPDT) switch, and in the example of FIG. 4 the signal generator 302 will not receive the +12 volt DC power supply when the first switch 102 is in the second or CHARGE/OFF position to allow charging of the battery 306. It will be understood that the battery 306 may supply any suitable voltage and that the indication of a +12 volt supply is for example only. It will further be understood that other aspects of the example wiring diagram 400, such as particular components, connections, and illustrated component values, are also for example only. Thus, for example, a synchronization device such as the synchronization device 100 described above may be implemented with suitable modifications to component values and/or other aspects of the example wiring diagram 400.

The example wiring diagram 400 also illustrates a fuse 402 which may be an AGC-type glass fuse as discussed above and which may be contained in the fuse holder 308 discussed above (the fuse holder 308 not being shown in FIG. 4). An output of the signal generator 302 may be connected to an input port of the amplifier 304, e.g., electrically connected to an input port that receives the amplifier audio input 310, where the amplifier audio input 310 is schematically shown in FIG. 4 as an input to the amplifier 304, via an appropriate network 404 of resistors and capacitors, for example. Example values of such resistors and capacitors are shown in FIG. 4. The amplifier 304 may also be connected to the example +12 volt DC power supplied by the battery 306. As further shown in FIG. 4, the amplifier 304 will also not receive the +12 volt DC power supply when the first switch 102 is in the second or CHARGE/OFF position to allow charging of the battery 306. For completeness, FIG. 4 also shows an implementation of the battery charge cord 120, which may be connected to the terminal of the first switch 102 that corresponds to the second or CHARGE/OFF position to allow charging of the battery 306.

An amplifier output 406 may be connected to a first contact of the terminal strip 108, with the second switch 104 (also represented by "S2" in FIG. 4) being connected to a second contact of the terminal strip 108. The second switch 104 may be a single pole, single throw (SPST) switch that may be manually opened before the start of the test associated with the vehicle (e.g., crash test) and the positioning of test equipment (the test equipment being further discussed with reference to FIG. 5 below) in the vehicle. In this manner, the audio tone signal or other signal generated by the signal generator 302 and output by the amplifier 304 will not be audible while the test equipment is positioned in the vehicle and the test is otherwise set up (e.g., while other data collection devices such as mobile phones are set up and, in particular, set to record data associated with the test). The second switch 104 may then be closed (e.g., manually) when the test equipment is positioned within the vehicle and the test is otherwise set up so that the audio tone signal or other signal becomes audible and thus detectable by, for example, microphones of the mobile phones in the vehicle (the mobile phones and the vehicle being further discussed with reference to FIG. 5 below). It will be understood from the teaching and disclosure herein that the signal generator 302 and the amplifier 304 may, in at least some examples, collectively be or be included within the aforementioned signal-generating circuitry. The amplifier 304 may be configured to amplify the signal, such as an audio tone signal, before the signal-generating circuitry provides the signal to the internal speaker(s) 116 or the external (e.g., driver and passenger area) speaker(s) so that the signal output by the internal speaker(s) 116 or the external speaker(s) may be output at any suitable or desired volume before any adjustment of the volume using the volume control device 118. In one example, the volume before any adjustment may be set so that the volume has a level of 80 dB at one meter away from the synchronization device 100 or the vehicle.

When the second switch 104 is closed so that the audio tone signal or other generated signal becomes audible or otherwise detectable by the data collection device(s) (e.g., by microphones of mobile phones in the vehicle), the third switch 106 (also represented by "S3" in FIG. 4), which may be a double pole, double throw (DPDT) switch, may be controlled (e.g., manually) to select the internal speaker(s) 116 or the external speaker(s) 408 for audio output. As shown in the example wiring diagram 400, the internal speaker(s) 116 may be a single 8-ohm internal speaker, though any suitable internal speaker or speakers may be used in the case of audio output via the internal speaker(s) 116. Thus, the third switch 106 may constitute additional circuitry in the example wiring diagram 400 (e.g., circuitry in addition to the signal-generating circuitry that may be or may include the signal generator 302 and the amplifier 304) that selects the at least one output device. That is, the third switch 106 may constitute additional circuitry that selects whether the at least one output device to which the signal is provided is the internal speaker(s) 116 or the external speaker(s) (e.g., within the driver and passenger area of the vehicle) 408.

Additional circuitry in the example wiring diagram 400 may also include additional switching circuitry such as that shown in FIG. 4 as also being connected to the first and second contacts of the terminal strip 108. With reference to the discussion above, this additional switching circuitry may be or may include, for example, a relay 410 configured to interrupt the providing of the signal to the at least one output device so as to prevent the data collection device(s) (e.g., including mobile phones) associated with the vehicle from receiving the signal. As also discussed above, the relay 410 may be normally closed, as shown in FIG. 4, and the relay 410 may be caused to open by connection of an additional data collection device, such as the test equipment, to the relay 410. Thus, the test equipment (which as noted above is further discussed with respect to FIG. 5) may be electrically connected to the relay 410 at the start of the test in any suitable manner that causes the relay 410 to open. In response to the relay 410 opening, the second switch 104 may also open (e.g., automatically) and the providing of the signal to the at least one output device may thus be interrupted.

As discussed above, the preventing of the data collection device(s) from receiving the signal may indicate the start of the test associated with the vehicle. In another embodiment, the second switch 104 may be open until the test associated with the vehicle starts, thereby preventing the data collection device(s) from receiving the signal based on the test having not started. At the start of the test, the second switch 104 may close to allow the data collection device(s) to receive the signal output by the at least one output device. In this embodiment, the receipt of the signal output by the at least one output device by each data collection device indicates the start of the test associated with the vehicle and allows data collected by the data collection device associated with the vehicle to be synchronized with data from another data collection device or devices, which may include test equipment in the vehicle as described below, in an analogous manner to the indication of the start of a test and allowing of data synchronization described above.

IV. Example System Including Synchronization Device for Vehicle Test

Figure 5:
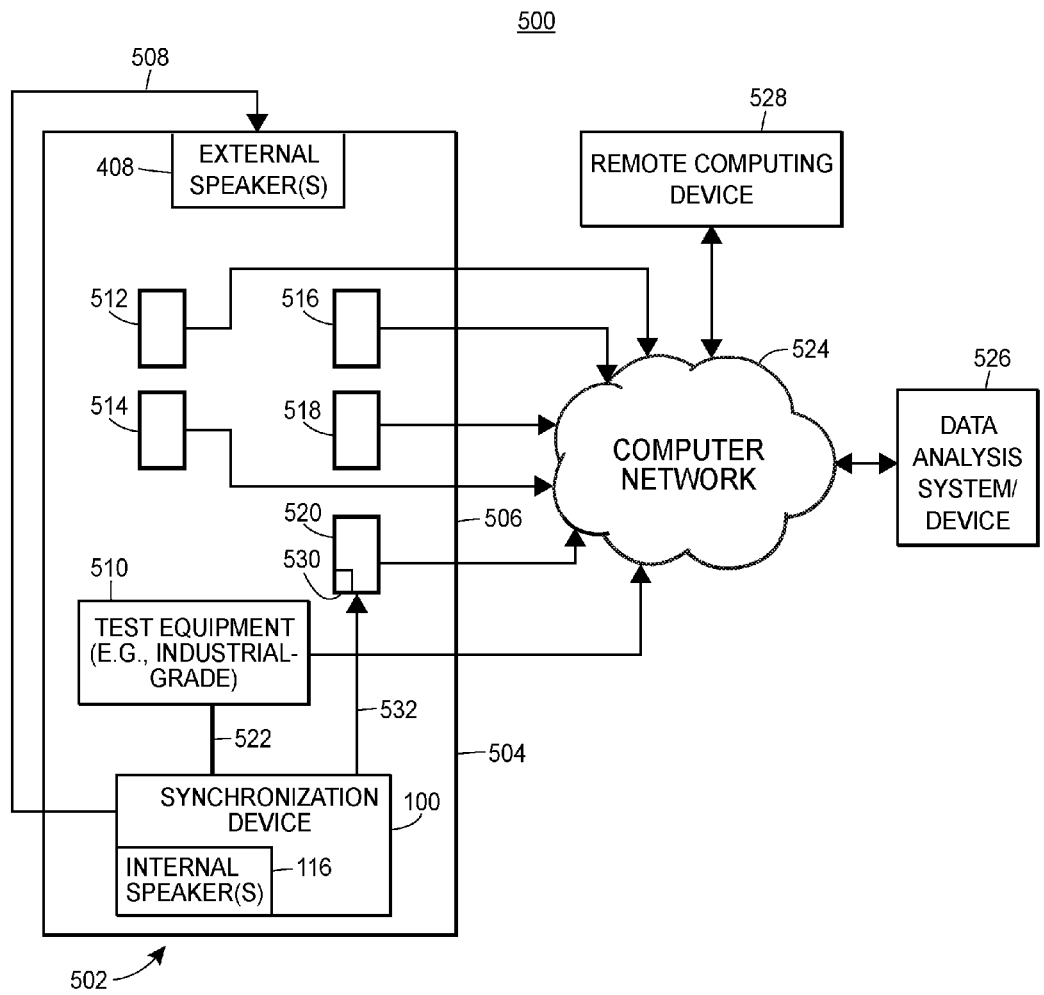
FIG. 5 illustrates an example system for synchronizing data associated with a vehicle test.

FIG. 5 illustrates an example system 500 for synchronizing data associated with a vehicle test. The example system 500 may include a vehicle 502, which may be the vehicle discussed above with which a test (e.g., crash test) is associated. The vehicle 502 may include a synchronization device area 504, such as a trunk of the vehicle 502 or other suitable location for placement of the synchronization device 100. The vehicle 502 may also include a driver and passenger area 506. The synchronization device 100 may, as discussed above and as shown in FIG. 5, include components such as the internal speaker(s) 116, and the driver and passenger area 506 may include the external speaker(s) 408. An electrical connection 508 may be used to provide the generated signal from the synchronization device 100 to the external speaker(s) 408. The electrical connection 508 may be implemented in a manner consistent with, for example, the wiring diagram 400 of FIG. 4.

The driver and passenger area 506 may also include test equipment 510, such as industrial-grade test equipment, which may include various types of instrumentation for use during a test such as a crash test. For example, the test equipment 510 may include one or more accelerometers, barometers, gyroscopes, and/or any suitable instrumentation and/or other devices useful in collecting data associated with the vehicle during the test. In another example, the test equipment 510 may be positioned outside the driver and passenger area 506, such as within the synchronization device area 504, and electrical connection of the test equipment 510 to other components of the system 500, as more fully described herein, may be suitably modified from that described herein.

The driver and passenger area 506 may also include a number of mobile phones or other suitable computing and/or instrumentation device(s) (e.g., device(s) having instrumentation similar to that of the test equipment 510), such as, but not limited to, desktop computer(s), laptop computer(s), tablet(s), phablet(s), and/or any other suitable computing and/or instrumentation device(s). In the example of FIG. 5, mobile phones 512, 514, 516, 518, and 520 are shown. However, the number of mobile phones and/or other computing device(s) and/or instrumentation device(s) shown in FIG. 5 is by way of example only. For example, in some embodiments where the vehicle 502 is subjected to a crash test, between twenty and thirty mobile phones and/or other computing and/or instrumentation device(s) may be associated with the vehicle 502 (e.g., located inside the driver and passenger area 506).

As noted above, the test equipment 510 may connect to the synchronization device 100 in order to cause, for example, the relay 410 to open and thus indicate the start of the test associated with the vehicle 502. As such, the example of FIG. 5 shows a connection 522 between the test equipment 510 and the synchronization device 100. The connection 522 may be, for example, a wiring connection or a direct physical connection of the test equipment 510 to the synchronization device 100 (such a direct physical connection not being shown in FIG. 5) that, in any event, causes the relay 410 to open. The connection 522 may be, in some examples, manually placed or otherwise made between the test equipment 510 and the synchronization device 100 at the start of the test. Thus, when the relay 410 opens at the start of the test, the audio tone signal, for example, from the synchronization device 100 is no longer audible from the output of, for example, the external speaker(s) 408 to microphones of the mobile phones 512-520. Thus, in sound files that may begin recording on the mobile phones 512-520 during setup of the test, the audio tone may disappear at the time the relay 410 opens. Data files may also begin recording on the mobile phones 512-520 during setup of the test and may include, for example, data from various instruments and/or sensors and/or related functionality of the mobile phones 512-520 collected during the test associated with the vehicle 502. By sending and/or receiving such sound files and data files over a computer network 524 to a data analysis system or device 526, an indication of the time at which the audio tone signals received by the mobile phones 512-520 indicates a start of the test may be determined at the data analysis system or device 526 based on the sound files. In particular, in the present example, the sound files may each indicate that the audio tone signal drops to zero amplitude at the start of the test and thereby may each indicate the start of the test, and the time of the start of the test, in a more synchronized manner than would be achieved by indicating such times in files recorded on mobile phones using, for example, indications of time obtained from a network time server, as discussed above. Consequently, the data collected in the data files of the mobile phones 512-520 may be more accurately associated with a start time of the test (e.g., it may be more accurately and/or precisely determined that particular data in a data file occurred a certain amount of time after the start of the test). If desired, data collected and/or analyzed using the data analysis system or device 526 may be provided to a remote computing device 528 via the computer network 524, as shown in FIG. 5, or in some cases directly (not shown as such in FIG. 5) for storage, further analysis, or any desired suitable purpose.

In some embodiments, the computer network 524 may be a computer network of the insurance provider that develops an application for mobile phones to perform crash detection during normal driving of a vehicle, as discussed above. For example, the computer network 524 may be provided or used by the insurance provider or the insurance provider may otherwise control or facilitate communications over the computer network 524. The computer network 524 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 524 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

In some embodiments, the signal-generating circuitry (e.g., the signal generator 302 and the amplifier 304) may be coupled by an electrical connection, for example, to an input(s) of one or more of the mobile devices 512-520. In such embodiments, the aforementioned at least one output device may be or may include the amplifier 304 and the at least one output device (e.g., the amplifier 304) may thus output the signal (e.g., at the amplifier output 406) so as to allow the one or more of the mobile phones 512-520 associated with the vehicle 502 to receive the signal from the amplifier 304 (e.g., from the amplifier output 406) at an input(s) of the one or more of the mobile phones 512-520. A corresponding example implementation is shown in FIG. 5 by way of the input 530 of the mobile phone 520 and the electrical connection 532 from the synchronization device 100 to the mobile phone 520. The input 530 of the mobile phone 520 may be, for example, any suitable jack, such as a microphone jack. In this embodiment, the signal generator 302 may stop generating the signal at the start of the test, the power to the amplifier 304 may be interrupted (e.g., by movement of the first switch 102), and/or any suitable event may occur to prevent the mobile phone 520 and any other mobile phone connected to the signal-generating circuitry from receiving the generated signal (e.g., audio tone signal) at the start of the test.

V. Example Timing Diagram for Vehicle Test

Figure 6:
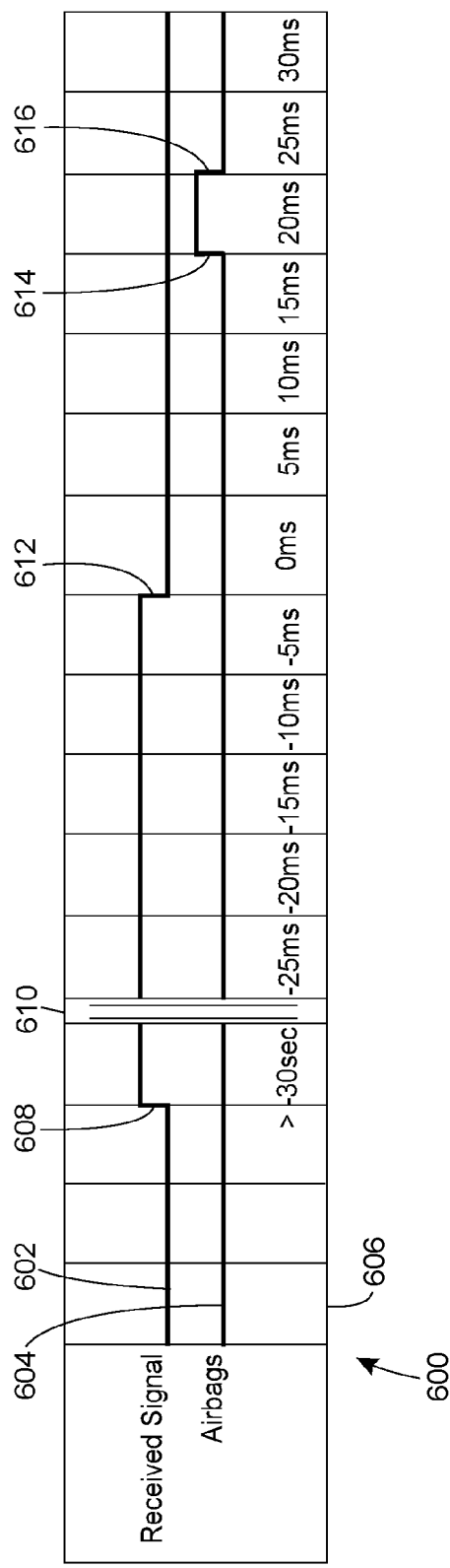
FIG. 6 is an example timing diagram associated with a vehicle test.

FIG. 6 is an example timing diagram 600 associated with a vehicle test, such as a crash test of the vehicle 502 performed using the devices illustrated and described above with respect to FIG. 5. The timing diagram 600 shows a received signal 602 and an airbags signal 604 plotted against a horizontal axis 606 indicative of a time (e.g., a relative time associated with the test). As shown in FIG. 6, a rising edge 608 of the received signal 602 may occur at a time during which the audio tone signal is output and is audible, such as thirty seconds before the test (e.g., during setup of the test or after setup of the test and before a start of the test). A gap 610 in the horizontal axis 606 is used to represent relatively static conditions leading up to the start of the test, such as no vehicle movement, no intentional mobile phone or test equipment movement, etc. The remainder of the horizontal axis 606 illustrates relatively smaller five millisecond (ms) increments of time.

As shown by a falling edge 612 of the received signal 602, the audio tone signal may become no longer audible, such as by prevention of the mobile phones 512-520 and the test equipment 510 from receiving the audio tone signal (or other signal generated by the signal-generating circuitry of the synchronization device 100). The falling edge 612 may be designated as (relative) "time zero" and thus corresponds to a time of zero ms on the horizontal axis 606. This time may be recorded in the aforementioned sound files, for example, to facilitate synchronization of the contents of the aforementioned data files. However, it will be appreciated from the disclosure and teaching herein that any suitable use of the falling edge 612, which indicates in some embodiments (as discussed in greater detail above) the start of the test, to synchronize data collected by various devices such as the mobile phones 512-520 and the test equipment 510, may be employed.

As shown by a rising edge 614 of the airbags signal 604 occurring at twenty ms after the start of the test, the crash of the vehicle 502 may occur at twenty ms after the start of the test. Data collected before, during, and after the crash at the relative time of twenty ms may be synchronized as discussed above. A falling edge 616 of the airbags signal 604—which may occur after the vehicle 502 has impacted a target and the airbags have fully deployed, for example—may occur at, for example, twenty-five ms after the start of the test. Thus, as discussed above, proper synchronization of collected data with respect to the start of the test—as may be achieved using the various embodiments described herein—is critical for optimal use of such data in view of the short time of the actual crash.

VI. Example Operation of Computing Device(s)

Figure 7:
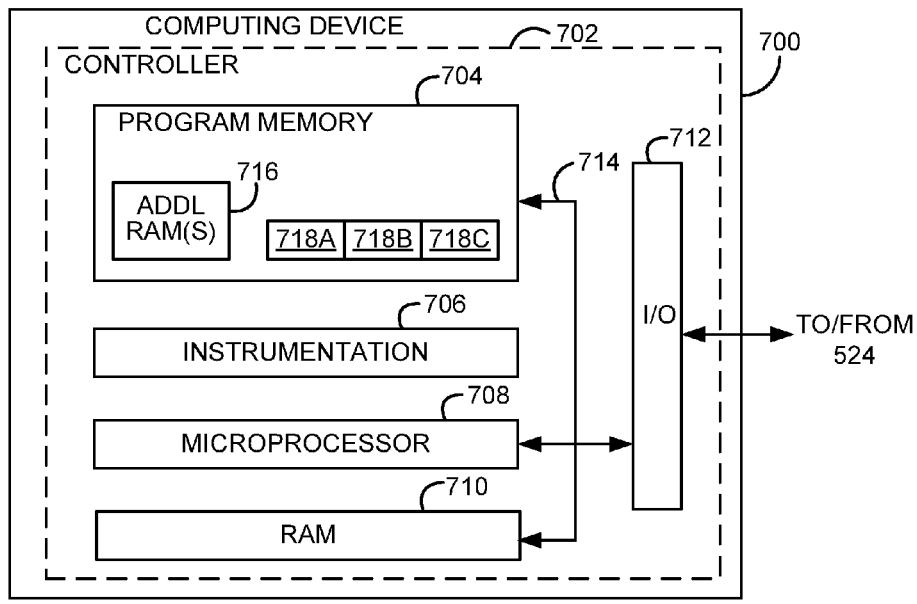
FIG. 7 illustrates an example computing device and components thereof that may be used in implementing, for example, one or more of the devices of the example system of FIG. 5.

FIG. 7 illustrates an example computing device 700 and components thereof that may be used in implementing, for example, one or more of the mobile phones 512-520, the data analysis system or device 526, the remote computing device 528, and/or any other suitable device such as one of the devices shown or otherwise included in the example system 500. The example computing device 700 may include a controller 702. The controller 702 may include a program memory 704; instrumentation 706 such as instrumentation and/or other devices useful for collecting data in, for example, one of the mobile phones 512-520 as more fully described above; a microcontroller or a microprocessor 708; a random-access memory (RAM) 710; and an input/output (I/O) circuit 712, all of which may be interconnected via an address/data bus 714. The program memory 704 may store computer-executable instructions, which may be executed by the microprocessor 708.

It should be appreciated that although FIG. 7 depicts only one microprocessor 708, the controller 702 may include multiple microprocessors 708. Similarly, the program memory 704 of the controller 702 may include additional RAM(s) 716 and multiple program memories 718A, 718B and 718C (or any suitable number of multiple program memories) storing one or more corresponding modules, routines, and/or instructions, etc. according to the particular configuration of the controller 702 and the computing device 700. Such modules, routines, and/or instructions, etc. may be used in performing various operations for synchronizing data associated with a vehicle test, such as example operations as described herein. Additionally, although FIG. 7 depicts the I/O circuit 712 as a single block, the I/O circuit 712 may include a number of different types of I/O circuits (not depicted). The RAM(s) 710, 716 and the program memory/memories 718A, 718B and 718C may be implemented in any known form of non-transitory computer readable storage media, including but not limited to semiconductor memories, magnetically readable memories, and/or optically readable memories. It should also be appreciated that the example computing device 700 may include additional, fewer, or alternate components.

VII. Example Method for Synchronizing Data Associated with a Vehicle Test

Figure 8:
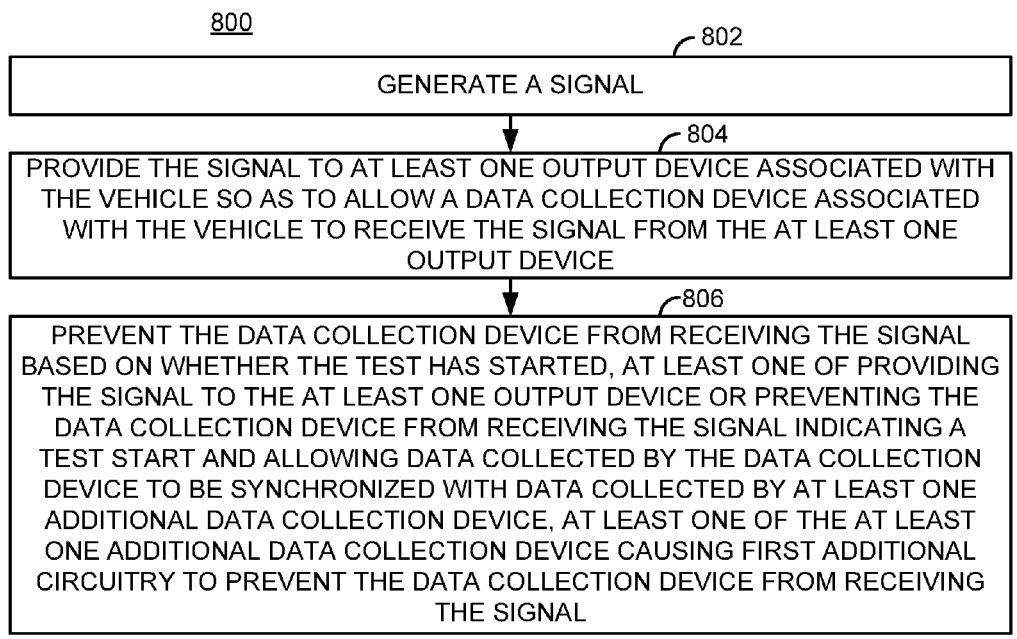
FIG. 8 is a flow chart of an example method, routine, or process for synchronizing data associated with a vehicle test.

FIG. 8 is a flow chart of an example method, routine, or process 800 for synchronizing data associated with a vehicle test, such as data associated with a crash test of the vehicle 502. The example method, routine, or process 800 may implement, by way of example, various actions described above with respect to the synchronization device 100. Signal-generating circuitry of a synchronization device, such as the signal generator 302 and the amplifier 304 of the synchronization device 100, may generate a signal (block 802). For example, the signal-generating circuitry may generate an audio tone signal, such as a DTMF signal, as further discussed above. In other embodiments, the signal-generating circuitry may generate any suitable radio frequency signal, as also discussed above. The generated signal may be any suitable signal that is detectable by a data collection device, such as a mobile phone (e.g., one of the mobile phones 512-520) or test equipment (e.g., the test equipment 510).

The signal-generating circuitry may also provide the signal to at least one output device associated with the vehicle 502 so as to allow a data collection device(s) (e.g., one of the mobile phones 512-520 and/or the test equipment 510) associated with the vehicle 502 to receive the signal from the at least one output device (block 804). The at least one output device may be the internal speaker(s) 116 of the synchronization device 100, which as noted above may be in a trunk of the vehicle 502. In another example, the at least one output device may be the external speaker(s) 408 of the vehicle 502 in, for example, the driver and passenger area 506. The at least one output device may be selected to be the internal speaker(s) 116 or the output speaker(s) 408 using, for example, the third switch 106, as described with respect to, for example, FIGS. 1 and 4. Thus, as noted above, the third switch 106 may constitute additional circuitry (e.g., in addition to the signal-generating circuitry, which may include the signal generator 302 and the amplifier 304) that selects whether the at least one output device to which the signal is provided is the internal speaker(s) 116 or the external speaker(s) (e.g., within the driver and passenger area of the vehicle) 408.

Additional circuitry of the synchronization device 100 may prevent the data collection device(s) associated with the vehicle 502 from receiving the signal based on whether a test associated with the vehicle 502 (e.g., a crash test) has started (block 806). The additional circuitry that prevents the data collection device(s) associated with the vehicle 502 from receiving the signal may be, in one example, first additional circuitry of the synchronization device 100 such as the relay 410, whereas the third switch 106 may be second additional circuitry of the synchronization device 100. At least one of providing the signal to the at least one output device or preventing the data collection device(s) from receiving the signal may indicate a start of the test and may allow data collected by the data collection device(s) to be synchronized with data collected by at least one additional data collection device (e.g., at least another one of the mobile phones 512-520 and/or the test equipment 510). Thus, preventing the data collection device(s) from receiving, for example, a generated audio tone signal in the manner described hereinabove may indicate the start of the test as described hereinabove. The data collection device(s) may record in a sound file(s) when the generated audio tone signal is no longer received, and each the at least one additional data collection device may similarly record this event in a sound file(s), with each data collection device recording this event in a respective sound file, for example. Respective data files recorded by the data collection devices may then be synchronized with respect to the start of the test more reliably than, for example, using indications of time obtained from a network time server.

With continued reference to the actions discussed with respect to block 806, it is further noted that at least one of the at least one additional data collection device associated with the vehicle 502, such as the test equipment 510, may cause the additional circuitry of the synchronization device 100 (e.g., the first additional circuitry including, for example, the relay 410) to prevent the data collection device(s) from receiving the signal. For example, as described above, the connection (e.g., electrically, direct physical connection, etc.) of the test equipment 510 to the relay 410 may cause the relay 410 to open, thereby preventing the generated signal (e.g., audio tone signal) from being audible at the data collection device(s).

As will be apparent from the above description, and as should be appreciated with respect to all examples presented in this disclosure, various ones of the functions or operations shown in FIG. 8 are optional. Furthermore, the functions or operations shown in FIG. 8 (and each flow chart herein) may be performed in any suitable order, any desired number of times, and/or with any suitable variation to the particular order and/or combination shown so as to achieve a desired result, such as a desired manner of synchronizing data associated with a vehicle test.

Figure 9:
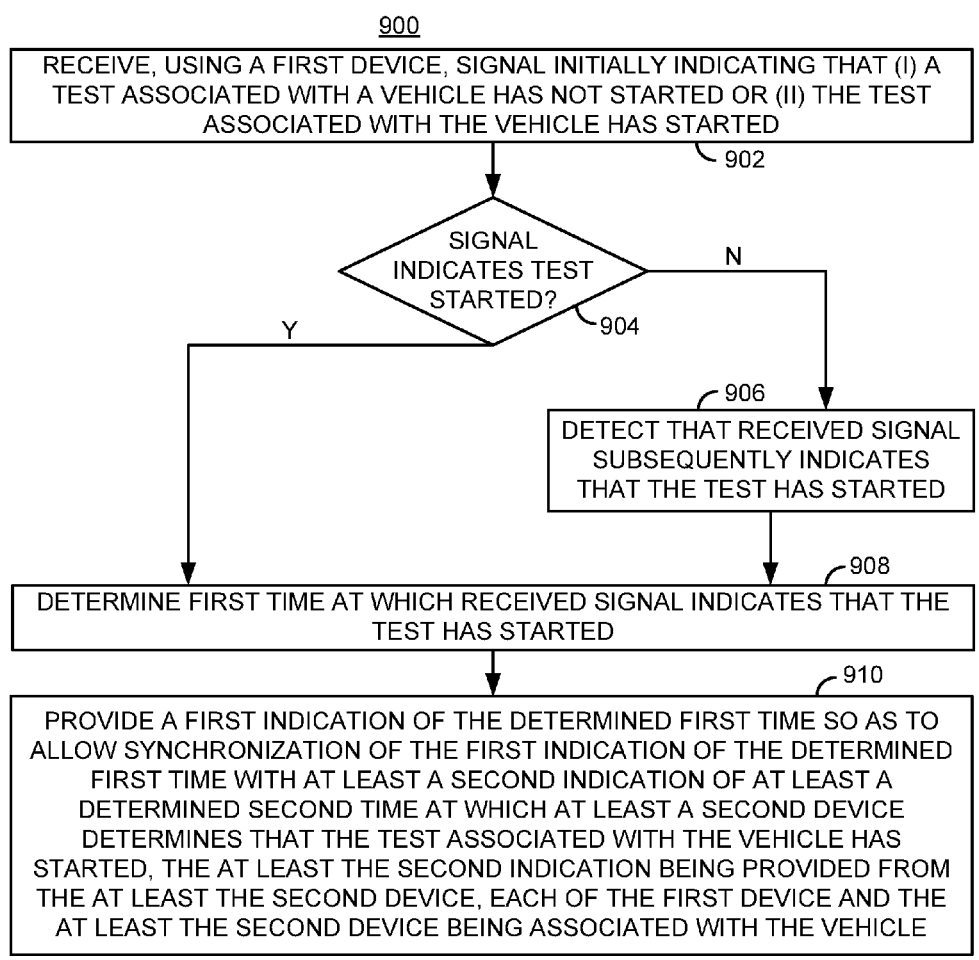
FIG. 9 is a flow chart of an example method, routine, or process for synchronizing indications of a start time of a vehicle test.

VIII. Example Method for Synchronizing Indications of a Start Time of a Vehicle Test FIG. 9 is a flow chart of an example method, routine, or process 900 for synchronizing indications of a start time of a vehicle test, such as indications of a start time of a crash test of the vehicle 502. The example method, routine, or process 900 may implement, by way of example, various actions described above with respect to the synchronization device 100. One or more processors of a first device, which may be one or more processors of, for example, one of the mobile phones 512-520 or one or more processors of the test equipment 510, may receive a signal initially indicating one of that a test associated with the vehicle 502 has not started or that the test associated with the vehicle 502 has started (block 902). For example, in embodiments where receipt of an audio tone signal indicates that the test has not started, as discussed above, the received signal initially indicates that the test has not started if the received signal is or includes an audio tone signal. Conversely, the received signal may initially indicate that the test has started if the received signal does not include an audio tone signal. In another example where receipt of an audio tone signal occurs at a start of the test and thus indicates that the test has started, the received signal may initially indicate that the test has not started if the received signal does not include an audio tone signal. Conversely, in this example, the received signal initially indicates that the test has started if the received signal is or includes an audio tone signal.

The one or more processors may determine whether the received signal initially indicates that the test has started (block 904), such as by performing a determination based on the conditions described above. If it is determined that the received signal initially indicates that the test has not started, the one or more processors may detect that the received signal subsequently indicates that the test has started (block 906). For example, the one or more processors may detect that the received signal satisfies the applicable conditions above (e.g., includes or does not include an audio tone signal) in order to detect that the received signal subsequently indicates that the test has started. The method may remain at block 906 until the detection described with respect to block 906 occurs. Detection of whether the received signal includes or does not include an audio tone or tones may be performed using, for example, suitable implementation of a Fast Fourier Transform (FFT), the Goertzel algorithm, and/or in any suitable manner.

In the event that the determination described with respect to block 904 leads to performance of the actions described with respect to block 906 and the one or more processors thus detect that the received signal subsequently indicates that the test associated with the vehicle 502 has started, the one or more processors may determine a first time at which the received signal indicates that the test associated with the vehicle 502 has started (block 908). For example, referring to the example timing diagram 600 of FIG. 6, the one or more processors may record the relative "time zero" corresponding to the start of the test, such as the time at which the falling edge 612 of the received signal 602 occurs, in a sound file of the first device.

If it is determined with respect to block 904 that the received signal initially indicates that the test associated with the vehicle 502 has started, the one or more processors may perform the actions described with respect to block 908, which actions are discussed in further detail above. That is, the one or more processors may determine the first time at which the received signal indicates that the test associated with the vehicle 502 has started.

The one or more processors may provide a first indication of the determined first time (e.g., an indication of the "time zero" recorded in the sound file for the first device) so as to allow synchronization of the first indication of the determined first time with at least a second indication of at least a determined second time at which at least a second device determines that the test associated with the vehicle 502 has started (block 910). The at least the second indication may be determined using the at least a second device in a similar manner as the first indication is determined (e.g., based on whether the signal generated by the signal-generating circuitry is detected and at what time(s) the signal is detected and not detected), and may be provided from the at least the second device. In this manner, in one example, the data analysis system or device 526 may synchronize the first indication of the determined first time with the at least the second indication of the at least the determined second time. The at least the second device may be one or more of: (i) another one of the mobile phones 512-520, and/or (ii) the test equipment 510, for example.

As discussed above, data in addition to data indicative of the start time of the test associated with the vehicle 502 may also be synchronized. For example, sensed data such as accelerometer data, gyroscopic data, barometric data, etc. may also be synchronized relative to the start time of the test. In some embodiments, a single file may contain all of the data collected by the mobile phones or other computing devices 512-520, and another file may contain the data collected by the test equipment 510, with the two files being time-synchronized with one another. In some embodiments, one or more files in which data is originally collected may be used to create a shorter derivative file(s) by, for example, removing data associated with the gap 610 in the horizontal axis 606 of the example timing diagram 600 and retaining, for example, twenty-five milliseconds of data before the start of the test instead of thirty seconds, as shown in FIG. 6. The data associated with the gap 610 may be removed because this data may be data collected while the test is being set up, for example, and may not include data useful to an analysis of the test. In one example, creation of a derivative file may shorten an original file length of ten to thirty minutes to a length on the order of ten seconds, where the original file length of ten to thirty minutes may be attributable to file creation and data collection before and during test set-up. Shortening the original file length may include removing data corresponding to a preset or predetermined amount of time, such as a preset or predetermined amount of time before the start of the test. A ten second derivative file may include data more closely centered around the "time zero" that corresponds to the start of the test. It will be appreciated that the aforementioned file lengths are by way of example only, and that an original file(s) and/or derivative file(s) may have a shorter or longer length(s). Creation of the derivative file(s) may also include changing a numbering scheme within an original data file(s) so as to facilitate synchronization and/or efficient creation of the derivative file(s).

It will further be appreciated in light of the teaching and disclosure herein that, for example, synchronization and/or analysis of the data collected by the mobile phones or other computing devices 512-520 and the test equipment 510, for example, may be performed by one or more processors of one or more of the mobile phones or other computing devices 512-520 and/or one or more processors of the test equipment 510. Such synchronization and/or analysis, for example, may also or alternatively be performed by another device(s). For example, such synchronization and/or analysis may be performed using the data analysis system or device 526. Furthermore, creation of a derivative file(s) as discussed above may also be performed using any suitable device or combination of devices, such as any suitable combination of one or more of the mobile phones or other computing devices 512-520, the test equipment 510, or the data analysis system or device 526.

It will still further be appreciated in light of the teaching and disclosure herein that additional suitable ways of determining a start time of a test associated with a vehicle, such as the vehicle 502, and synchronizing data accordingly, may be implemented. As just one example, a server or server endpoint may be placed in the vehicle 502, such as in the driver and passenger area 506. The mobile phones or other computing devices 512-520 and, if desired, the test equipment 510, may generate and send requests to the server for an indication(s) of time. The server may be configured to communicate with each of the mobile phones or other computing devices 512-520 and, if desired, the test equipment 510, at the same time using, for example, Internet Protocol (IP). The indication(s) of time may be sent in any suitable manner that accurately informs the mobile phones or other computing devices 512-520 and, if desired, the test equipment 510 of the start time of the test and/or that allows the mobile phones or other computing devices 512-520 and, if desired, the test equipment 510 to determine the start time based on the indication(s) of time and, for example, data collected by the devices 510-520.

IX. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., one or more of the mobile phones 512-520, the data analysis system or device 526, the remote computing device 528, and/or any suitable computing device(s) described herein). The routines may be included as part of any of the modules described in relation to FIG. 5 or as part of a module that is external to the system illustrated by FIG. 5. For example, the methods or portions thereof may be part of a browser application(s) or an application(s) running on any of the devices in the example system 500 as a plug-in or other module of the browser application. Further, the methods may be employed as "software-as-a-service" to provide, for example, one or more of the mobile phones 512-520, the data analysis system or device 526, the remote computing device 528, and/or any suitable computing device(s) with access to the example system 500.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example synchronization device 100, an example system 500, and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a device and method for synchronizing data associated with a vehicle test. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A synchronization device for synchronizing data associated with a vehicle test, the synchronization device comprising:
   signal-generating circuitry configured to:
      generate a signal; and
      provide the signal to at least one output device associated with a vehicle so as to allow a data collection device associated with the vehicle to receive the signal from the at least one output device; and first additional circuitry configured to be caused, by at least one of at least one additional data collection device associated with the vehicle, to prevent the data collection device associated with the vehicle from receiving the signal based on whether a test associated with the vehicle has started, wherein at least one of the signal-generating circuitry or the first additional circuitry is configured to cause an indication of a start of the test associated with the vehicle and allow data collected by the data collection device associated with the vehicle to be synchronized with data collected by the at least one additional data collection device associated with the vehicle by at least one of the providing of the signal to the at least one output device or the preventing of the data collection device associated with the vehicle from receiving the signal.

2. The synchronization device of claim 1, further comprising second additional circuitry configured to select the at least one output device to include one of a speaker internal to the synchronization device or a speaker of the vehicle, the speaker of the vehicle being external to the synchronization device and internal to the vehicle.

3. The synchronization device of claim 1, wherein the signal-generating circuitry is configured to generate the signal as an audio tone signal, and wherein the first additional circuitry comprises switching circuitry configured to interrupt the providing of the signal to the at least one output device so as to prevent the data collection device associated with the vehicle from receiving the signal.

4. The synchronization device of claim 3, wherein the signal-generating circuitry comprises an amplifier configured to amplify the signal before the signal-generating circuitry provides the signal to the at least one output device associated with the vehicle.

5. The synchronization device of claim 1, wherein the signal-generating circuitry comprises an amplifier coupled to an input of the data collection device associated with the vehicle, the amplifier configured to amplify the signal, wherein the at least one output device includes the amplifier so as to allow the data collection device associated with the vehicle to receive the signal from the amplifier at the input of the data collection device.

6. The synchronization device of claim 1, wherein the preventing of the data collection device associated with the vehicle from receiving the signal occurs after the providing of the signal to the at least one output device, and wherein the occurrence of the preventing of the data collection device associated with the vehicle from receiving the signal after the providing of the signal to the at least one output device indicates the start of the test associated with the vehicle and allows the data collected by the data collection device associated with the vehicle to be synchronized with the data collected by the at least one additional data collection device associated with the vehicle.

7. The synchronization device of claim 1, wherein the signal-generating circuitry is configured to generate the signal as a radio frequency signal.

8. The synchronization device of claim 1, wherein the data collection device associated with the vehicle is a mobile phone.

9. A method for synchronizing data associated with a vehicle test, the method comprising:
generating, using signal-generating circuitry of a synchronization device, a signal;
providing, using the signal-generating circuitry of the synchronization device, the signal to at least one output device associated with a vehicle so as to allow a data collection device associated with the vehicle to receive the signal from the at least one output device; and
preventing, using first additional circuitry of the synchronization device, the data collection device associated with the vehicle from receiving the signal based on whether a test associated with the vehicle has started, at least one of the providing of the signal to the at least one output device or the preventing of the data collection device associated with the vehicle from receiving the signal indicating a start of the test associated with the vehicle and allowing data collected by the data collection device associated with the vehicle to be synchronized with data collected by at least one additional data collection device associated with the vehicle, and at least one of the at least one additional data collection device associated with the vehicle causing the first additional circuitry to prevent the data collection device associated with the vehicle from receiving the signal.

10. The method of claim 9, further comprising selecting, using second additional circuitry of the synchronization device, the at least one output device to include one of a speaker internal to the synchronization device or a speaker of the vehicle, the speaker of the vehicle being external to the synchronization device and internal to the vehicle.

11. The method of claim 9, wherein generating the signal using the signal-generating circuitry of the synchronization device includes generating an audio tone signal, wherein preventing, using the first additional circuitry, the data collection device associated with the vehicle from receiving the signal based on whether the test associated with the vehicle has started includes interrupting, using switching circuitry, the providing of the signal to the at least one output device at the start of the test so as to prevent the data collection device associated with the vehicle from receiving the signal.

12. The method of claim 9, the preventing of the data collection device associated with the vehicle from receiving the signal occurring after the providing of the signal to the at least one output device, and the preventing of the data collection device associated with the vehicle from receiving the signal after providing the signal to the at least one output device indicating the start of the test associated with the vehicle and allowing the data collected by the data collection device associated with the vehicle to be synchronized with the data collected by the at least one additional data collection device associated with the vehicle.

13. The method of claim 9, wherein generating the signal using the signal-generating circuitry of the synchronization device includes generating a radio frequency signal.

14. The method of claim 9, wherein the data collection device associated with the vehicle is a mobile phone.

15. A non-transitory computer-readable medium having instructions stored thereon that, when executed by one or more processors of a first device, cause the one or more processors to:
receive a signal initially indicating one of that a test associated with a vehicle has not started or that the test associated with the vehicle has started;
detect, when the received signal initially indicates that the test associated with the vehicle has not started, that the received signal subsequently indicates that the test associated with the vehicle has started;
determine a first time at which the received signal indicates that the test associated with the vehicle has started; and provide a first indication of the determined first time at which the received signal indicates that the test associated with the vehicle has started so as to allow synchronization of the first indication of the determined first time with at least a second indication of at least a determined second time at which at least a second device determines that the test associated with the vehicle has started, the at least the second indication being provided from the at least the second device, each of the first device and the at least the second device being associated with the vehicle.

16. The non-transitory computer-readable medium of claim 15, wherein the instructions, when executed by the one or more processors, cause the one or more processors to receive the signal initially indicating that the test associated with the vehicle has not started by receiving an audio tone signal.

17. The non-transitory computer-readable medium of claim 16, wherein the instructions, when executed by the one or more processors, cause the one or more processors to receive the audio tone signal by receiving a dual-tone multi-frequency (DTMF) signal.

18. The non-transitory computer-readable medium of claim 16, wherein the instructions, when executed by the one or more processors, cause the one or more processors to detect that the received signal subsequently indicates that the test associated with the vehicle has started by detecting that the received signal does not include the audio tone signal.

19. The non-transitory computer-readable medium of claim 15, wherein the instructions, when executed by the one or more processors, cause the one or more processors to provide the first indication of the determined first time at which the received signal indicates that the test associated with the vehicle has started by indicating the determined first time in a file stored by the first device, and wherein the providing of the first indication of the determined first time at which the received signal indicates that the test associated with the vehicle has started allows the synchronization of the data including the first indication of the determined first time with the data including the at least the second indication of the at least the determined second time by allowing the indication of the determined first time in the file stored by the first device to be synchronized with at least one additional indication of the at least the determined second time in at least one additional file stored by the at least the second device.

20. The non-transitory computer-readable medium of claim 15, wherein the providing of the first indication of the determined first time further allows synchronization of first telematics data of the vehicle collected using the first device during the test associated with the vehicle with at least second telematics data of the vehicle collected using the at least the second device during the test associated with the vehicle.

* * * * *